United States Patent [19]
Chang et al.

[11] Patent Number: 5,367,523
[45] Date of Patent: Nov. 22, 1994

[54] ADAPTIVE RATE-BASED CONGESTION AND FLOW CONTROL IN PACKET COMMUNICATIONS NETWORKS

[75] Inventors: Rong-Feng Chang, Chai-yi, Taiwan, Prov. of China; John E. Drake, Jr., Pittsboro, N.C.; Levent Gün, Durham, N.C.; Lap T. Huynh, Cary, N.C.

[73] Assignee: International Business Machines Corporation, Armonk, N.Y.

[21] Appl. No.: 112,737

[22] Filed: Aug. 26, 1993

[51] Int. Cl.$^5$ ............................................. H04J 3/22
[52] U.S. Cl. ...................................... 370/84; 370/94.1
[58] Field of Search ................... 370/17, 60, 60.1, 79, 370/84, 94.1, 94.2, 94.3

[56] References Cited

U.S. PATENT DOCUMENTS

| | | | |
|---|---|---|---|
| 5,042,029 | 8/1991 | Hayakawa | 370/94.1 |
| 5,063,562 | 11/1991 | Barzilai et al. | 370/79 |
| 5,280,470 | 1/1994 | Buhrke et al. | 370/94.2 |

OTHER PUBLICATIONS

Z. Haas, "Adaptive Admission Congestion Control," *ACM SIGCOMM Computer Communications Review*, vol. 21, No. 5, pp. 58–76, Oct. 1991.

W. Dabbous, "On High Speed Transport Protocols," *IEEE*, Mar. 1989.

*Primary Examiner*—Douglas W. Olms
*Assistant Examiner*—Hassan Kizou
*Attorney, Agent, or Firm*—Gerald R. Woods

[57] ABSTRACT

An end-to-end, closed loop flow and congestion control system for packet communications networks exchanges rate request and rate response messages between data senders and receivers to allow the sender to adjust the data rate to avoid congestion and to control the data flow. Requests and responses are piggy-backed on data packets and result in changes in the input data rate in a direction to optimize data throughput. GREEN, YELLOW and RED operating modes are defined to increase data input, reduce data input and reduce data input drastically, respectively. Incremental changes in data input are altered non-linearly to change more quickly when further away from the optimum operating point than when closer to the optimum operating point.

22 Claims, 6 Drawing Sheets

ADAPTIVE RATE-BASED CONGESTION AND FLOW CONTROL IN PACKET COMMUNICATIONS NETWORKS

TECHNICAL FIELD

This invention relates to congestion and flow control in packet communications systems, and, more particularly, to improved end-to-end, closed loop, distributed control mechanisms for implementing such congestion and flow control.

BACKGROUND OF THE INVENTION

In packet communications systems, it is common to reserve bandwidth for high priority packets which are then transmitted in preference to lower priority packets. Such lower priority traffic therefore must be managed to take advantage of the bandwidth remaining after all of the higher priority traffic has been served. This remaining bandwidth can vary widely depending on the activity of the high priority traffic and it is therefore of considerable importance to manage the low priority traffic so as to optimize the use of the widely varying "left-over" bandwidth in the network, and, at the same time, avoid congestion in the network which reduces network throughput.

It has become common to utilize window-based flow control mechanisms to avoid congestion in the packet communications network. Such window-based mechanisms pro-allocate receiver buffer credits to packet sources and notify the corresponding sender how much data can be sent. Upon detection of congestion, either at an outgoing link (if the receiver is an intermediate node) or within a node, the receiver withholds buffer credits, forcing the sending partner to slow down the launching of packets or to stop transmission altogether. This process, also known as "back pressure" congestion control, is repeated hop by hop, eventually reaching the sources of traffic causing the congestion and forcing those sources to slow down.

Such window-based, back pressure mechanisms perform efficiently with low speed networks with reasonably high bit error rates. As networks move toward higher transmission speeds and more reliable transmission media such as optical fibers, the window-based mechanisms no longer perform adequately. The cost of such hop-by-hop mechanisms becomes prohibitively expensive and inefficient due to the fact that a sender can send an entire window's worth of data and be required to wait for the receipt of new buffer credits from the receiver before continuing. The resulting silent period is at least as long as two propagation delays and results in a direct loss of throughput during this silent interval. Furthermore, the window-based flow control does not smooth the transmission of data into the network and hence causes large oscillations in loading due to the clustering of packets, further degrading network performance. Using larger windows merely worsens the silent period throughput degradation.

In order to better accommodate modern high speed and reliable packet communications networks, it has been proposed to use an end-to-end congestion control mechanism which relies on the regular transmission of sample packets having time stamps included therein. One such mechanism is disclosed in "Adaptive Admission Congestion Control," by Z. Haas, *ACM SIGCOMM Computer Communications Review*, Vol 21(5), pages 58–76, October 1991. In the Haas article, successive time-stamped sample packets are used to calculate changes in network delays which are averaged to represent the state of the network. The averaged network delay is then used to control the admission of packets to the network by controlling the admission rate, either by controlling the inter-packet gap directly, or by adjusting the token rate in a standard leaky bucket scheme at the admission point.

One disadvantage of the Haas end-to-end congestion control mechanism is that Haas sends sampling packets at regular intervals regardless of the traffic load from a sender. Sending such sampling packets when the sender is idle is wasted effort and reduces the good throughput of the system. Furthermore, Haas must await the arrival of a plurality of sampling packets before initiating congestion control, thus providing too slow a response time to permit flow control as well as congestion control.

Another disadvantage of the Haas scheme is the so-called "accumulation effect." If the length of queues along the congestion path is built up gradually by small amounts, the overall delay can exceed the threshold allowed for the overall connection without being detected by the Haas endpoint detection scheme. The network can therefore become congested without timely correction when using the Haas congestion control scheme.

Yet another disadvantage of the Haas congestion control scheme is the fact that the inter-packet control gap is used to control the input packet rate. Sources of short packets are therefore penalized unfairly compared to sources of long packets when the inter-packet gap control technique of Haas is used to control congestion. Finally, and most importantly, the Haas congestion control scheme requires relatively frequent transmission of sampling packets to provide timely control information. Indeed, the overhead for such sampling packets can reach up to twenty percent of the entire throughput of the network, making the Haas congestion control scheme provide a lower throughput than an uncontrolled network when the traffic load is less than eighty percent. If the transmission rate of Haas' sampling packets were to be reduced to approximate the round trip delay period, on the other hand, the scheme simply would not work at all due to the paucity of control information available at the sender. That is, the averaging step used to reduce the noise in the control signal would make the scheme so unresponsive to the congestion to be controlled that the low sampling rate would be unable to correct the congestion.

SUMMARY OF THE INVENTION

In accordance with the illustrative embodiment of the present invention, the end-to-end, closed loop flow and congestion control in packet networks is accomplished by calculating, for every requested sampling interval, the lower of either the rate at which the receiver is accepting data from the network (congestion control), or the rate at which the receiver is able to deliver data to the end user (flow control). Thus, the network transfer rate is used to detect congestion while the end user acceptance rate is used to control the flow of data into the network so as not to exceed the user acceptance rate. The lower of these two rates is, of course, used to control entry into the network. Such a rate control mechanism is provided for each direction of transmission on each connection, and each end of a connection can request flow and congestion control information by piggy-backing a request for control information on the current data packet being sent to a receiver. The receiver calculates the network transfer rate by dividing the number of bits received since the last request by the length of the interval since that last request. Rate information is also piggy-backed on data packets for return to the sender. Requests are timed to reflect the data transmittal rate into the network, requests being more frequent when traffic is heavy and less frequent when traffic is light, and thus conserving network resources when not needed for flow or congestion control.

More particularly, to implement the flow and congestion control of the present invention, three different operating modes are defined for the traffic flow control mechanism. That is, the sender uses the traffic feedback information from the receiver to set the sender into one or the other of the three operating modes which can be called the "green," "yellow" and "red" operating modes. The sender is set to the green mode when the rate information received from the receiver indicates that the receiver rate is equal to or greater than the average data input rate at the sender, less a sensitivity threshold used to compensate for the accumulated delay effect described above. The sender is set to the yellow operating mode when the received rate is less than the average data input rate less the sensitivity threshold, and the sender is set to the red operating mode if a timeout occurs following the expected waiting period for a reply to the most recent request for rate information.

The green operating mode is used when the receiver is able to receive data at a higher rate than the currently permitted rate. In the green operating mode, the sending rate can therefore be increased by some incremental amount which does not exceed the maximum rate which will be tolerated by the network, where the maximum rate is the rate negotiated by the sender when the connection is set up. If the current operating mode is other than green, and the most recent response from the receiver calls for a shift to the green operating mode, this shift is delayed at least one request-response period. This requirement for confirmation of shifts to the green operating mode by at least two responses calling for such a shift to the green operating mode prevents oscillations in operating mode due to transients in the data rates.

If the receiving rate returned in the response message is slower than the current sending rate by more than the same sensitivity threshold, the operating mode is set to yellow. In the yellow operating mode, the sending rate is reduced by some reduction factor, preferably a reduction factor between 0.9 and 1.0. In the yellow operating mode, it is assumed that the network is saturating and can carry no more traffic. The sender continues in the yellow operating mode, reducing the sending rate for each new response message indicating a lower receiving rate than the current sending rate (less the sensitivity threshold) until at least two responses are received dictating the need to shift to the green operating mode.

If a response timeout occurs while the sender is waiting for a response to its most recent request for rate information, the sender immediately assumes that congestion has delayed the response and the sending rate is therefore cut drastically, e.g., by half, or to the latest received receiving rate, whichever is lower. The sender remains in the red operating mode until two or more request responses call for a return to the green operating mode.

In accordance with one feature of the present invention, the incremental increase in the sending rate during the green operating mode can be defined to be non-linear to permit rapid increases in sending rate until saturation is approached, and thereafter, the incremental increases can be kept small to avoid wide fluctuations around a desirable operating point. Conversely, incremental decreases in the sending rate during the yellow operating mode can likewise be defined non-linearly to permit small decreases for small departures from an optimal operating point and ever larger decreases as the departure from the optimal operating point itself increases in magnitude.

The flow and congestion control mechanism of the present invention is highly adaptive to network conditions in that it is responsive to the offered traffic load and to the congestion, and results in maximizing throughput of the network while at the same time minimizing network congestion. The flow control mechanism of the present invention also smooths the input traffic to discourage very large data bursts and the resulting large queues in the network. Finally, the rate-based control mechanism of the present invention provides equal and fair access to all connections regardless of their relative average packet length.

A major advantage of the congestion control scheme of the present invention over prior art schemes such as Haas' is the ease with which the scheme of the present invention can be implemented and the low overhead, in both processor cycles and in network bandwidth, with which that implementation can be operated. Moreover, the same mechanism which provides congestion control also provides flow control, thereby avoiding the necessity of a separate flow control mechanism for each connection. The flow and congestion control mechanism of the present invention is overlaid on all connections at the connection source and destinations for each connection and requires no changes in the operation of the network itself. That is, the flow and congestion control mechanism of the present invention is entirely implemented at user access endnodes of the network. Moreover, the control mechanism of the present invention can be realized either in the transport layer of the network protocol or in the network layer, providing great flexibility for networks of differing architectures. Piggy-backing rate requests and responses on regular data packets both conserves network resources and forces rate control message interchanges to reflect the data packet rate.

Finally, the flow and congestion control mechanism of the present invention can be readily modified to provide protection against congestion arising from the accumulation effect. In particular, by keeping track of the delay accumulations in a connection, the reported receiving rate can be adjusted to reduce the accumulated delays. In one embodiment, a reduction in the receiving rate is accomplished indirectly by extending the measuring period over which the receiving rate is calculated, thereby causing the receiving rate to be less than it would otherwise be.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
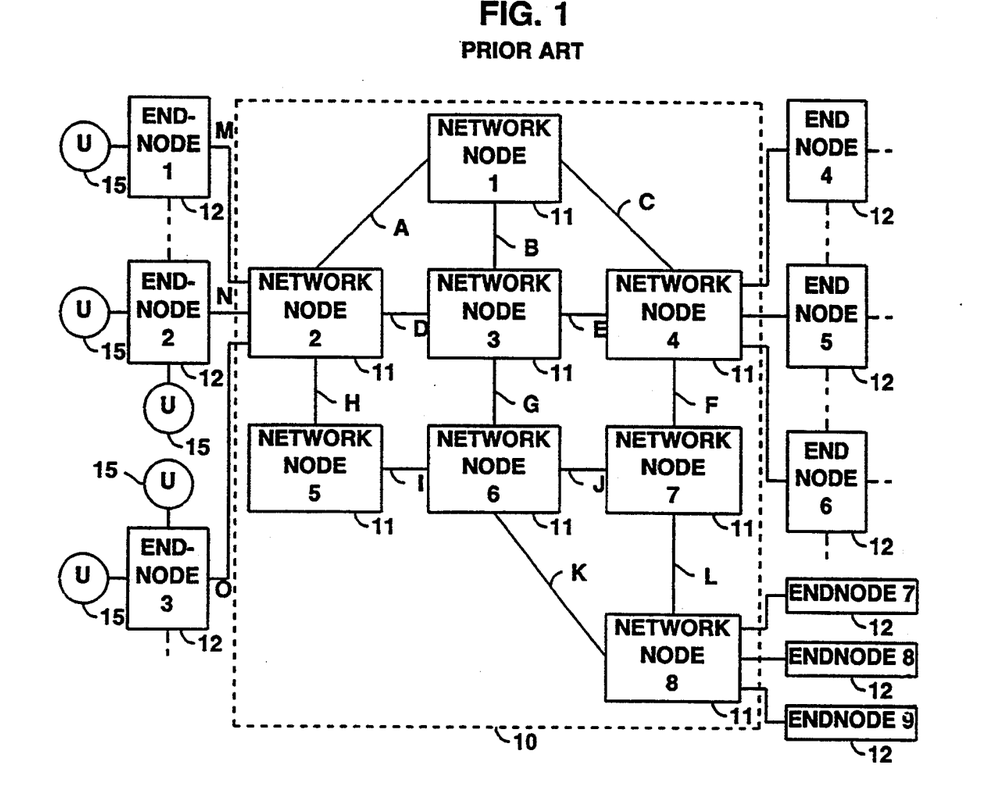
FIG. 1 shows a general block diagram of a packet communications system in which the flow and congestion control mechanism of the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as providing decision points within the node. The network nodes 11 each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at that node, and the provision of directory services and topology database maintenance at that node.

Each of end nodes 12 comprises either a source of digital data to be transmitted to another end node, a utilization device for consuming digital data received from another end node, or both. Users 15 of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available for the new connection. One such algorithm is disclosed in the co-pending application, Ser. No. 07/874,917, filed Apr. 28, 1992, now U.S. Pat. No. 5,233,604, issued Aug. 3, 1993 and assigned to applicant's assignee. Once such a route is calculated, a connection request message is launched on the network, following the computed route and updating the bandwidth occupancy of each link along the route to reflect the new connection. Traffic offered to the network of FIG. 1 may be of difference Classes of Service (COSs) or require different Quality of Service (QOSs). That is, the connection calculated for different sources may require different levels of bandwidth, different delay guarantees, or different loss probabilities. Real time signals such as voice and television, for example, require higher levels of priority than accounting information or other non-real time signals. Such connection characteristics are negotiated along with the bandwidth requirements and enforced by assigning higher priorities to the transmission of the real time signals and, under congestion, discarding the non-real time packets before discarding the real time packets.

In packet communications networks such as that shown in FIG. 1 it is necessary to manage the traffic so as to enforce the Class of Service and Quality of Service guarantees for the high priority packet sources while, at the same time, to optimize the transmission of the lower priority traffic through the network. It is assumed that the higher priority controls guarantee the transmission of the high priority traffic so as to meet the negotiated service level. The present invention is directed at the control of the lower priority traffic so as to optimize the transmission of this low priority traffic and, at the same time, to avoid congestion in the network.

Figure 2:
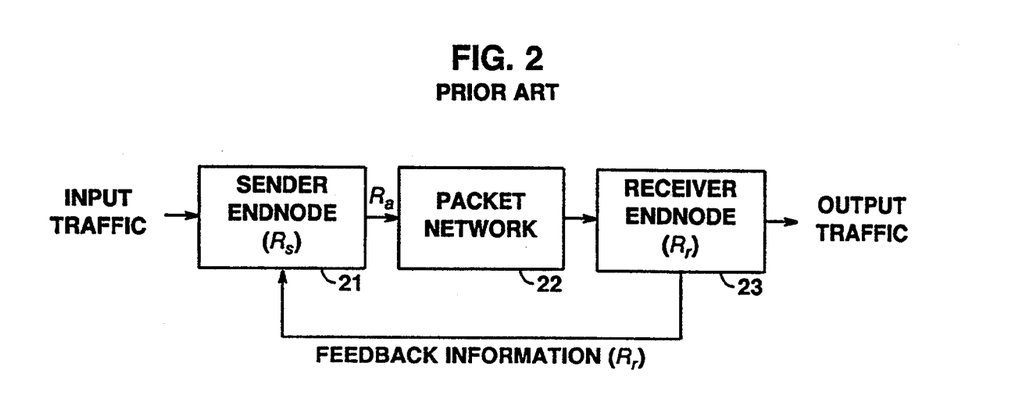
FIG. 2 shows a general block diagram of a closed loop, end-to-end control mechanism in which the flow and congestion control scheme of the present invention might be implemented.

In FIG. 2 there is shown a general block diagram of an adaptive rate based flow and congestion control mechanism in accordance with the present invention for controlling the traffic in a packet communications network such as that shown in FIG. 1. The control mechanism of FIG. 2 comprises a sender endnode 21 and a receiver endnode 23, both connected to packet network 10 (FIG. 1). Endnodes 21 and 23 are, of course two of the endnodes 12 of FIG. 1 and represent the endnodes at the end of a connection between a sending user 15 and a receiving user 15. Indeed, two flow and congestion control mechanisms such as that shown in FIG. 2 is provided for each connection through network 10 and, one for each direction of transmission on a connection. Before proceeding to a detailed discussion of the operation of FIG. 2, the following definitions will be made to assist in this discussion.

PARAMETER DEFINITIONS

- $R_s$ is the instantaneous maximum bit rate at which the sender endnode 21 is allowed to transmit data into the network 10.
- $R_a$ is the average actual bit rate at which data is sent into the network 10 by the sender endnode 21 in a particular measurement interval. Generally, $R_a \leq R_s$ because there are gaps between packets when sender endnode 21 has nothing to send.
- $R_r$ is the minimum of two rates; first, the rate at which the receiver endnode 23 accepts data from network 10; and, second, the rate at which the user connected to endnode 23 can process data. Both values are measured by receiving endnode 23 and only the minimum rate of the two is sent back to sender endnode 21 as receiver rate $R_r$.
- $M_r$ is the length of the measurement interval at the receiving endnode 23. $M_r$ is used in computing the rate measurement $R_r$ to be returned to the sending endnode 21.
- $B_s$ is the number of bits that sender endnode 23 is allowed to send continuously in a single burst at the rate $R_s$.
- $B_t$ is the burst time for the burst $B_s$, i.e., $B_t = B_s/R_s$.
- $M_s$ is the length of the measurement interval at the sending endnode 21. $M_s$ is used in computing the actual rate $R_a$ of transmission from endnode 21, i.e., $R_a = N_s/M_s$, where $N_s$ is the number of bits sent by sender endnode 21 during the measurement interval $M_s$. Measurement intervals of length $M_s$ occur in a serial sequence 1, 2, 3, ..., n, where n represents the nth interval in this sequence. $M_s$ is set independently for each connection and is on the order of magnitude of the round trip delay for the connection.
- $T_{out}$ is the time-out value for the normally expected round trip delay of transmissions from the sender endnode 21 to the receiver endnode 23 and back again. If the actual round trip delay exceeds $T_{out}$, it is assumed that the path is congested and that the packet has either been dropped en route or that the packet has been delayed in a long queue at an intermediate node. $T_{out}$ can a fixed constant which is calculated at the time a connection is being set up or can be estimated dynamically from network loading parameters.
- $T_s$ is network time delay for a rate request message experienced by the message in its transmission between endnode 21 to receiving endnode 23. $T_s$ can be thought of as the network queuing time for a rate request message, and varies over time.
- $T_q$ is the maximum network queuing time allowed for a given connection along the connection path through the network. $T_q$ is the sum of the individual queuing times for each hop along the connection path and is computed at the time the connection is set up, based on the Quality of Service requirements. $T_q$ is used as a threshold not to be exceeded in managing the traffic in the network in accordance with the present invention.

The closed loop feedback control mechanism of FIG. 2 operates generally to return to the sending endnode 21 a value for $R_r$ which is the minimum of two rates. One of these rates is the rate at which the receiver is accepting data from the network; the other rate is the rate at which receiver endnode 23 can deliver data to the end user. The former indicates the status of the path through the network and is used by the sending endnode 21 to regulate the input traffic so as to avoid overloading the path and thereby causing congestion in the network. The latter is used by the sending endnode 21 to avoid overloading the receiving user's capacity to receive data, thereby providing end-to-end flow control. Using this information, the sending endnode 21 can determine when congestion is about to develop in the network, and take appropriate action to avoid such congestion, or to detect overload of the receiving facilities and to slow traffic so as to match the reception capacity of the receiving user. When significant congestion actually does occur, sending endnode 21 takes even more drastic action to return the network load to a more optimum operating point.

More particularly, at the end of the nth measurement interval of length $M_s$, sending node 21 sends, piggy-backed on the current data packet being sent to receiving endnode 23, a request for rate information from receiving endnode 23. When this request is received by receiving endnode 23, the receiving rate $R_r(n)$ is calculated. $R_r(n)$ is the lower of either the number of bits received from network 10, or the number of bits delivered to the user, divided by the time interval $M_r$ since the last $(n-1)$th request. The calculated receiving rate $R_r(n)$ is returned to the sending endnode 21, for example, by piggy-backing this rate information on a normal data packet being returned to endnode 21. These message exchanges can be better seen in FIG. 3.

Figure 3:
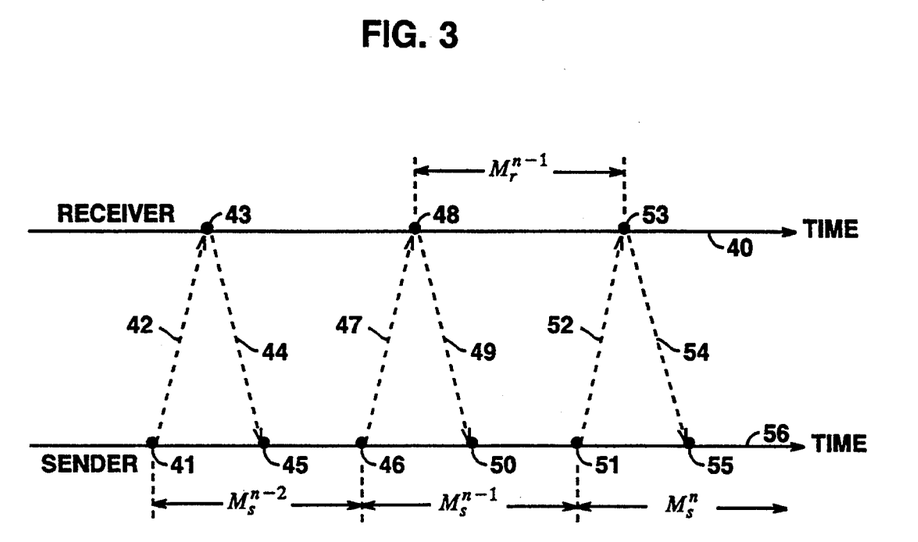
FIG. 3 shows a graphical representation of a typical exchange of requests for rate feedback information from a sender and the responses to such requests from the receiver, implementing the dynamic flow and congestion control scheme of the present invention.

Referring more particularly to FIG. 3, there are shown two time lines 40 and 56, corresponding, respectively, to time at the receiving endnode 23 of FIG. 2 (time line 40) and to time at the sending endnode 21 of FIG. 2 (time line 56). At time 41, sending endnode 21 sends a rate request message 42 to receiving endnode 23 for rate information, piggy-backed on the current data packet. This request is received at receiving endnode 23 at time 43 and the minimum flow control or congestion control rate $R_r$ is sent on rate response message 44 back to sending endnode 21, also piggy-backed on a data packet. This rate response message 44 is received at sending endnode 21 at time 45. At a future time 46, sending endnode 21 sends another rate request message 47 which is received at receiving endnode 23 at time 48 which then launches a second rate response message 49 which is received at sending endnode 21 at time 50. Yet another future time 51, sending endnode 21 sends another rate request message 52 which is received at receiving endnode 23 at time 53 which then launches another rate response message 54 which is received at sending endnode 21 at time 55. The exchange of rate request messages and rate response messages continues between endnodes 21 and 23 so long as the data source at endnode 21 remains active. (Of course, a similar exchange of rate requests and rate responses takes place between these two endnodes to control traffic flow and congestion in the opposite direction.)

As shown in FIG. 3, the sending measurement intervals $M_s$ extend between times 41-46, 46-51 and time 51 to the next request, not shown in FIG. 3. Similarly, the receiving measurement intervals $M_r$ extend between times 43–48 and 48–53. The value of $M_s$ determines the level of adaptability of the control mechanism; the smaller $M_s$, the tighter the control. On the other hand, the smaller $M_s$, the higher the cost in processing. The cost of transmission is virtually insignificant since the rate requests and rate responses can be piggy-backed on user data packets. It should be noted that $M_s$ also depends on the sending rate for data packets. The higher the data sending rate, the lower the value of $M_s$, and the lower the data sending rate, the longer the interval $M_s$ becomes, request messages stopping altogether when the data sending rate is zero. In general, the sending measurement interval $M_s$ is set to be on the order of a single round trip delay for information between sending endnode 21 of FIG. 2 and receiving endnode 23. The response of sending endnode 21 to the rate response messages from receiving endnode 23 can be better understood by considering FIG. 4 The sending rate $R_s$ controls the bit rate at which data packets are transmitted from sending endnode 21. If the control mechanism is a leaky bucket mechanism, the sending rate $R_s$ is used as the green token source rate $\gamma$ with the green token pool size equal to $B_s$, as taught in the copending application Ser. No. 07/943,097, filed Sep. 10, 1992, U.S. Pat. No. 5,311,513, and assigned to applicants' assignee.

Figure 4:
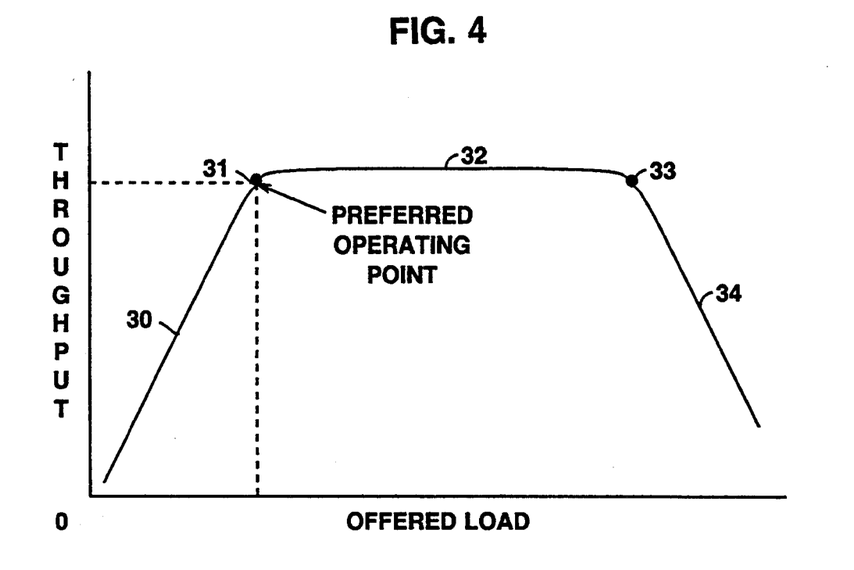
FIG. 4 shows a graphical representation of the typical traffic saturation curve for a packet communications network such as that shown in FIG. 1 and indicating the preferred operating point on the saturation curve.

In FIG. 4 there is shown a graphical representation of the offered load for a given path through a packet communications network such as network 10 of FIG. 1 versus the data throughput for that path. As can be seen in FIG. 4, the throughput is equal to the load for a linear portion 30 of the saturation curve of FIG. 4. At some knee point 31, saturation occurs in the network due to the fact that essentially all network resources are filled. For a portion 32 after knee 31, of the curve of FIG. 4, increase in offered load produce no increase in throughput, and path congestion begins to occur. At a cliff point 33 thereafter, the portion 34 of the curve of FIG. 4 shows that a decrease in throughput occurs for further increases in offered load due to the fact that many packets are dropped and most of the network resources are consumed in retransmitting packets. So-called "reactive" congestion control depends on detecting congestion and reacting thereto, usually by detecting the timeout of an expected message transfer time. Prior art congestion control schemes tended to be reactive in nature. "Preventive" congestion control, on the other hand, attempts to detect the approach to congestion and reduce the offered load to prevent congestion in the first place. The present invention is a preventive congestion control scheme.

It is clear from the saturation curve of FIG. 4 that the preferred operating point is the knee point 31 of FIG. 4. Below this offered load, the path is capable of handling a greater load than is being offered, and efficiency would increase if the offered load were to increase. On the other hand, loads greater than that represented at knee point 31 would produce no additional throughput and would simply increase the congestion in the network until throughput started to decrease at point 33. The goal of the congestion control mechanism of the present invention, then, is to maintain all paths through the network at or near the optimum operating point 31 of FIG. 4. That is, if the feedback rate indicates that the monitored path is below point 31, the sending endnode 21 increases the sending rate to bring the sending rate up closer to point 31. Conversely, if the feedback rate indicates that the monitored path is above point 31, the sending node 21 reduces the sending rate to bring this sending rate down closer to point 31. To assist in this control function, three different operating modes are defined for determining how the sending rate $R_s$ is to be adjusted in response to the varying values of the receiver rate $R_r$.

In particular, the sending node 21 is set to a first mode, called the GREEN mode, when the receiver rate $R_r$ is equal to or greater than the sender rate $R_s$ by some incremental amount called the sensitivity threshold. That is, set the mode to GREEN if $R_r \geq R_a - \Delta_R$, where $\Delta_r$ is the sensitivity threshold. In the GREEN mode, the sending rate is increased to bring it closer to point 31 of FIG. 4. In the GREEN mode, the monitored path is capable of handling more offered load than it is now experiencing and hence the load can be increased. The sensitivity threshold will be further discussed below.

The sending node is set to a second operating mode, called the YELLOW mode, when the receiver rate $R_r$ is less than the sender rate $R_s$, less the sensitivity threshold, i.e., $R_r < R_a - \Delta_R$. In the YELLOW mode, the sending rate is decreased to bring it closer to the point 31 of FIG. 4. In the YELLOW mode, the monitored path is becoming congested due to saturation, and cannot further increase throughput. The sending rate (offered load) is therefore reduced to reduce the congestion.

The sending node is set to a third operating mode, called the RED mode, when congestion has become so severe that loss of throughput is possible. The RED mode is entered when a timeout period ($T_{out}$) expires while waiting for a response to the most recent rate request. During the GREEN and YELLOW modes, the sending rate is changed slowly to smooth the input traffic. In the RED mode, the sending rate is reduced drastically to rapidly move the offered load back towards the optimum operating point 31.

The amount of increase in the sending rate during the GREEN mode is termed the increase rate $R_{inc}$. That is, every time the receiver rate $R_r$ is equal to or higher than the sending rate $R_s$ (less the sensitivity threshold $\Delta_R$), the sending rate is increased by $R_{inc}$, i.e., $R_s \rightarrow R_s + R_{inc}$. $R_s$, however, is never allowed to increase beyond the initially negotiated rate $R_{max}$ for that connection, reflecting the negotiated Quality of Service (QOS). The sending rate $R_s$ therefore remains at $R_{max}$ so long as the operating mode remains GREEN. In order to reduce oscillations in the system, the switch to the GREEN mode can be delayed until at least two successive rate messages require a switch to the green mode, i.e., two successive receiver rate messages with $R_r \geq R_s$. Note that $R_{inc}$ can be defined non-linearly to be large initially to quickly bring the sending rate up to the optimum point 31. Once point 31 is reached, further increases in the sending rate are kept small to avoid wide fluctuations around the preferred operating point 31. If more bandwidth becomes available in the network (reduced congestion), the value of $R_{inc}$ can be gradually increased again to take advantage of this newly available capacity.

If the receiver rate $R_r$ is lower than the sender rate $R_a$ by more than the sensitivity threshold ($R_r < R_a - \Delta_R$), the YELLOW mode is invoked and the sending rate $R_s$ reduced. In the YELLOW mode, the sending rate is reduced by a weighting factor $\Theta$, i.e., $R_s \rightarrow \Theta \times R_r$, where $\Theta$ is a value between 0.9 and 1.0 ($0.9 < \Theta < 1.0$), based on heuristics or modeling of the system controlled. In the YELLOW operating mode, the path is saturated (congestion control), or the receiving user cannot handle the receiver rate (flow control).

When a rate response time-out occurs, the RED mode is invoked and the sending rate $R_s$ is reduced drastically (or set to the receiver capability rate, whichever is lower). For example the sending rate can be reduced by half in the RED mode ($R_s \to 0.5 \times R_s$). It is necessary in the RED mode to reduce the offered load quickly and extensively to rapidly reduce the congestion.

While the dynamic flow and congestion control mechanism of the present invention could be implemented by special purposes circuitry, the preferred embodiment is implemented by programming a general purpose computer to carry out the scheme. The attached APPENDIX provides detailed pseudo code for implementing the inventive control mechanism, while FIGS. 5 through 9 comprise flow charts of this implementation. The flow charts of FIGS. 5-9 (and the pseudo code of the APPENDIX) are event driven in that the procedures of the flow charts and pseudo code are initiated by events such as the receipt of a data packet or the assembly of a packet for transmission.

Figure 5:
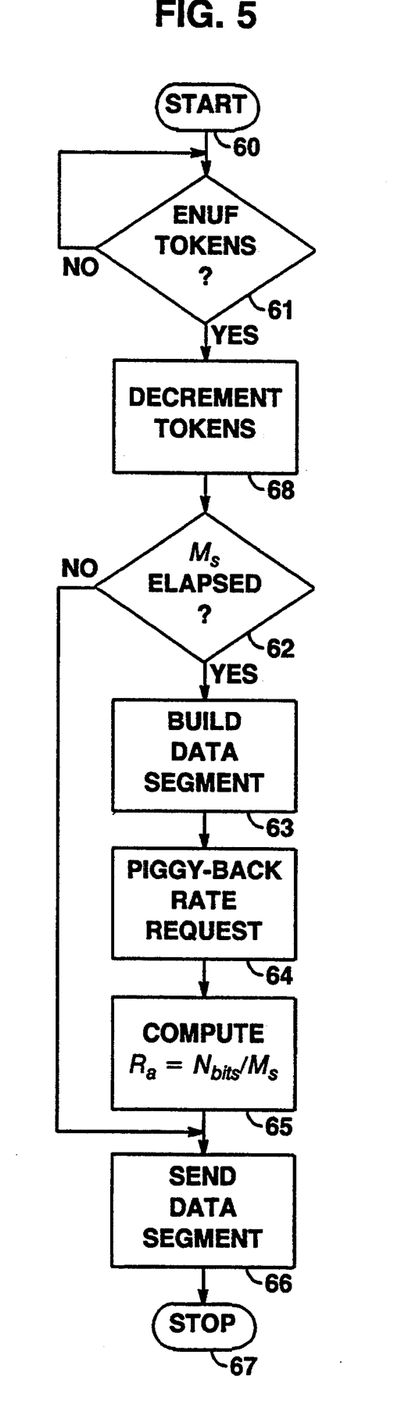
FIG. 5 shows a flow chart of the operation of a sending endnode in generating and launching a request for flow and congestion control rate information from the corresponding sending endnode in the packet network of FIG. 1, implementing the dynamic control scheme of the present invention.

In FIG. 5 there is shown a flow chart of the data sending algorithm at the sending endnode 21 of FIG. 2. Starting at start box 60, decision box 61 is entered where it is determined if enough green tokens have been accumulated to send a data packet. If not, decision box 61 is re-entered to await the accumulation of sufficient green tokens. If enough green tokens have been accumulated, box 68 is entered to decrement the green token count by the number of bits in the packet to be transmitted. Decision box 62 is then entered where it is determined if the sending measuring time $M_s$ has elapsed. If not, box 66 is entered where the next data segment is transmitted to the receiving endnode. The process then terminates in stop box 67. If $M_s$ has elapsed, box 63 is entered where the next data segment is constructed for transmission into the network 10 (FIG. 1). In box 64, a rate request is piggy-backed on the data segment constructed in box 64. This rate request need be no more that setting a single rate request bit in the header of the data segment to the rate request value. e.g., "1". The rate request may also include the value of $M_s$ (FIG. 2), if the accumulation effect is to be corrected as discussed in connection with FIG. 9. Box 65 is then entered where the value $R_a$ of the actual data transmission rate is calculated for the measurement interval $M_s$. This value will be used in the flow chart of FIG. 6 in computing the new sending rate $R_s$ when the rate response message is received. Box 66 is then entered where the data segment is launched on the network 10 (FIG. 1), using the currently operative sending rate $R_s$. The process terminates in stop box 67.

Figure 6:
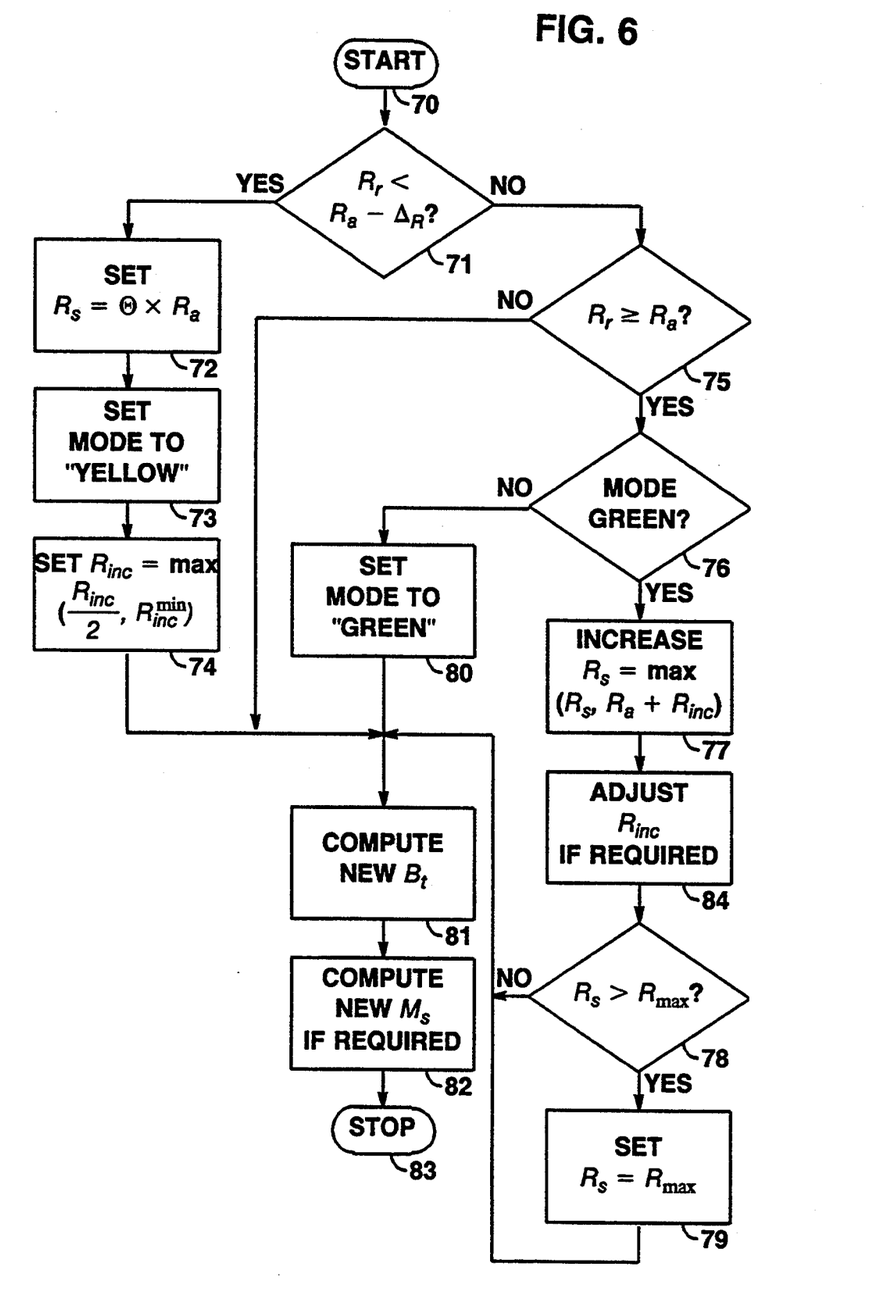
FIG. 6 shows a flow chart of the operation of a sending endnode in response to the receipt of a response to a request for rate information from the corresponding receiving endnode in the packet network of FIG. 1, implementing the dynamic control scheme of the present invention.

In FIG. 6 there is shown a flow chart of the processing which takes place at the sending endnode 21 upon receipt of a new rate response message from the receiving endnode 23. Starting in start box 70, decision box 71 is entered to determine whether the receiving rate $R_r$, received in the rate response message, is less than the actual transmission rate $R_a$ and the sensitivity threshold $\Delta_R$. The value of $\Delta_R$ is a compromise between control instability ($\Delta_R$ too small and the control mechanism reacts too quickly to any queuing delay in the network 10) and operation near the cliff 33 of FIG. 4 ($\Delta_R$ too large, resulting in marginal congestion). $\Delta_R$, for example can be calculated as $$\Delta_R = \frac{T_q}{M_s + T_q} R_a.$$

If the value of $R_r$ is less than $R_a$ less $\Delta_R$, as determined in decision box 71, box 72 is entered where the data sending rate $R_s$ is reduced by a factor $\Theta$. The value of $\Theta$ is based on the network topology of network 10 and is generally between 0.9 and 1.0, e.g., 0.95. In box 73 the mode is set to "YELLOW" to indicate that the sending rate is being reduced to avoid congestion (congestion control) or to avoid overloading the receiving user capacity (flow control). Box 74 is then entered to calculate the value for $R_{inc}$, i.e., the incremental rate at which the sending rate will be increased next time the receiving rate $R_r$ justifies sending rate increases. As shown in box 74, the previous value of $R_{inc}$ is reduced by half, but not below some minimum value $R_{inc}^{min}$. The value of $R_{inc}^{min}$ is set to insure a significant increase in the sending rate $R_s$ and has a value on the order of a few hundred bits per second to a few thousand bits per second. Box 81 is then entered where a new value of burst time $B_t$ is calculated, where $B_t = B_s/R_s$. That is, the burst time must be update each time the sending rate is changed to maintain a constant number of bits in a single burst. The burst time $B_t$ is used to control the transmission of data from sending endnode 21 in FIG. 2. Box 82 is thereafter entered to compute a new sending node measuring period $M_s$, if required. That is, $M_s$ can be reset based on a dynamic measurement of the round trip time. The process then terminates in stop box 83.

If it is determined, in decision box 71, that the receiving rate $R_r$ is greater than or equal to $R_a - \Delta_R$, decision box 75 is entered to determine whether or not $R_r$ is equal to or greater than the actual transmission rate $R_a$. If so, decision box 76 is entered to determine if the operating mode is already "GREEN". If not, the mode is set to "GREEN" in box 80 and box 81 entered to calculate a new value for $B_t$, a new value for $M_s$, if required, in box 82 and the process terminated in stop box 83.

If it is determined that the mode is already green in decision box 76, box 77 is entered to increase the sending rate $R_s$ to $R_a + R_{inc}$. That is, the sending rate is increased to the actual transmission rate increased by the incremental value calculated in box 74. If the existing sending rate is already higher than this incremented rate, however, the sending rate is left at this higher sending rate. Decision box 78 is then entered to determine whether this newly calculated sending rate $R_s$ is greater than the maximum transmission rate $R_{max}$ permitted over this connection. That is, each connection, when it is set up, is limited to a maximum transmission rate, depending on the requested Quality of Service. If the transmission rate $R_s$ exceeds $R_{max}$, it is reset to $R_{max}$ in box 79. Boxers 81 and 82 are then entered to calculate $B_t$ and $M_s$, respectively, and the process then terminated in stop box 83. If the new sending rate $R_s$ is not greater than $R_{max}$, as determined by decision box 78, box 81 is entered directly.

It can be seen that the flow chart of FIG. 6 requires two consecutive responses requiring increases in $R_s$ ("GREEN" operating mode) before the increase is effected. That is, the first time an increase might be made, box 80 is entered and no increase is made. The next time a response calls for and increase, decision box 76 determines that the "GREEN" operating mode has already been set and box 77 can be entered to execute the sending rate increase. The values of $\Delta_R$, $\Theta$, $R_{inc}$, $R_{inc}^{min}$, and $R_{max}$ can be adjusted to fine tune the operation of the rate-based, end-to-end, dynamic flow and congestion control system of the present invention.

Figure 7:
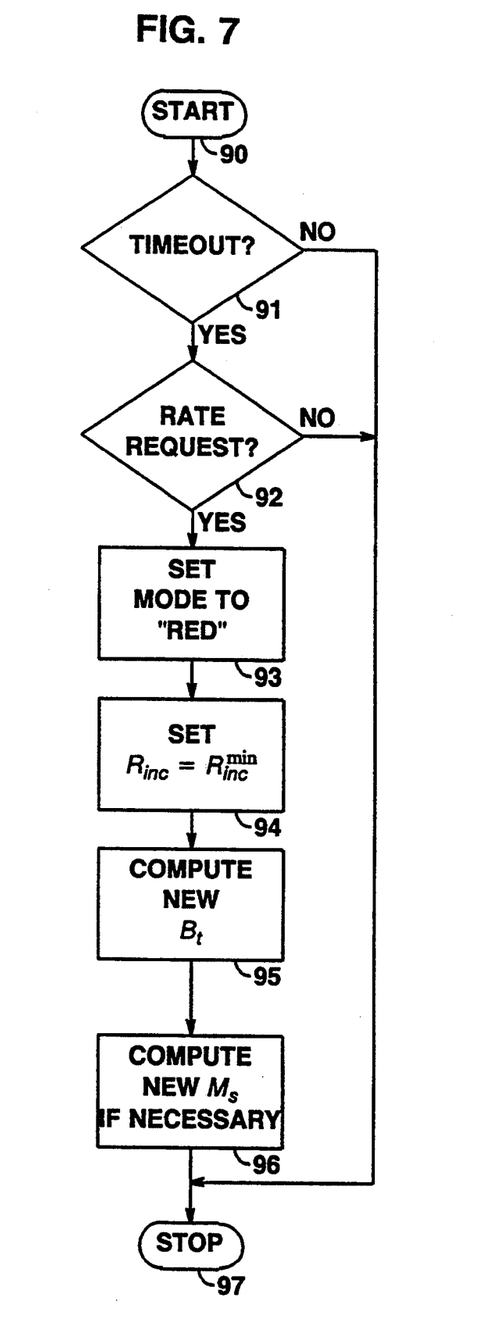
FIG. 7 shows a flow chart of the operation of the sending endnode in response to the time out of the waiting period for receipt of a response to a request for rate information from the corresponding receiving endnode in the packet network of FIG. 1, implementing the dynamic control scheme of the present invention.

In FIG. 7 there is shown a flow chart of the time out procedure used at the sending endnode 21 of FIG. 2. Starting at start box 90, decision box 91 is entered where it is determined if a timeout has occurred. That is, has the time elapsed since the last rate request message was sent (FIG. 5) exceeded the expected request-response period $T_{out}$? If the time out period has not expired, stop box 97 is entered to terminate the process. If the time out period has expired, as determined by decision box 91, decision box 92 is entered to determine whether a rate request has been sent which has not been responded to. If not, the process is again terminated in stop box 97. If a unanswered rate request has been sent, as determined by decision box 92, box 93 is entered to set the operating mode to "RED." In this mode, a drastic reduction in the sending rate $R_s$ is called for since congestion has already occurred to a sufficient degree to delay a rate response beyond the time out period $T_{out}$. As previously noted, in the RED mode, the sending rate $R_s$ is drastically reduced, e.g., cut in half, to relieve the existing congestion. In box 94 the value of $R_{inc}$ is set to the minimum value $R_{inc}^{min}$. That is, the value used to increase the sending rate $R_s$ when in the next GREEN operating mode is set to a minimum to make these increase as small as possible at the beginning of the rate increase process. In box 95 a new value of the maximum sending burst time $B_t$ is calculated, based on the new value of $R_s$ established in box 93. Thereafter, box 96 is entered to calculate a new value for the sending measurement interval $M_s$, if the round trip delay has changed substantially. The process terminates in stop box 97.

Figure 8:
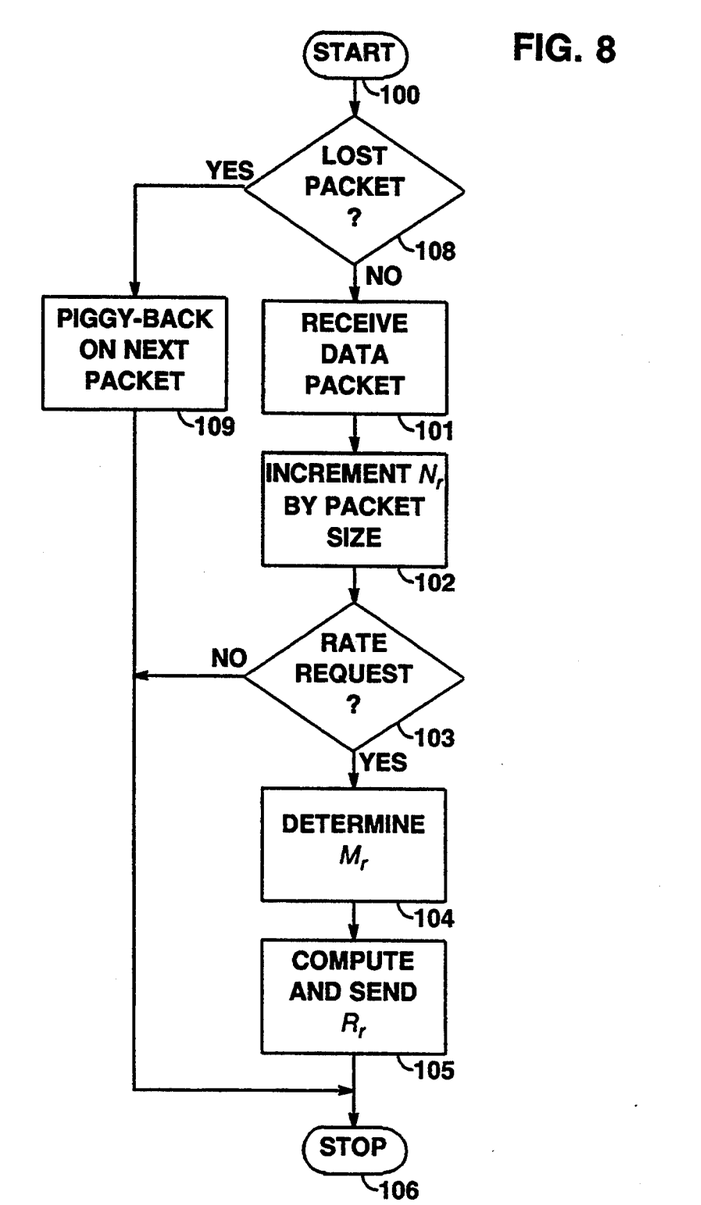
FIG. 8 shows a flow chart of the operation of the receiving endnode in responding to a request for rate information from the corresponding sending endnode in the packet network of FIG. 1, implementing the dynamic control scheme of the present invention.

In FIG. 8 there is shown a flow chart of the processing of rate requests received at the receiving endnode 23 of FIG. 2. Starting in start box 100, decision box 108 is entered to determine if a packet has been lost. The detection of a lost packet is dependent on, for example, packet sequence numbers included in each packet, and which can be used to detect the dropping of a packet at an overloaded queue somewhere in the connection path. If a lost packet is detected in decision box 108, box 109 is entered where a lost packet message is piggy-backed on the next transmitted packet from the receiving endnode 23 to the sending endnode 21. This message is treated by sending endnode 21 a message which is treated as a time out, invoking the procedure of FIG. 7.

If no packet loss is detected in decision box 108, box 101 is entered where the next data packet is received from network 10. Box 102 is then entered where the number of bits $N_r$ received in the current measurement period $M_r$ is incremented by the number of bits in the packet received in box 101. The value of $N_r$ will be used in box 105 to calculate the new value of $R_r$ to be returned to the sending endnode 21. Decision box 103 is then entered to determine whether a rate request has been received and not yet responded to. If not, the process terminates in stop box 106. If an unanswered rate request message has been received, as determined by decision box 103, box 104 is entered where the new receive period $M_r$ is calculated. Normally, the value of $M_r$ is determined simply by measuring the period since the reception of the last rate request message. As will be described in connection with FIG. 9, however, the value of $M_r$ can be adjusted to correct for the "accumulation effect" to be described below. Using this value of $M_r$, the value of the receiving rate $R_r$ is calculated and returned to the sending endnode 21 in box 105. Preferable, the receiving rate $R_r$ is piggy-backed on a data segment for return to the sending endnode 21. The process of FIG. 8 then terminates in stop box 106.

In packet communications networks such as that illustrated in FIG. 1, the queue lengths at the nodes along a connection path often are built up gradually by small amounts. This effect is called the "accumulation effect" and can result in accumulating sufficient queuing delays to exceed the overall connection delay negotiated at the time of connection set up without being detected at the connection endnodes 21 or 23 (FIG. 2). If the drift in the transit delay is not detected, the congestion control system is unable to respond thereto and the network can become congested because of this accumulation effect without correction. As will be discussed in connection with FIG. 9, the determination of the receiving measuring period $M_r$, in accordance with one feature of the present invention, has been modified to detect and respond to the accumulation effect and prevent such undetected congestion. The flow and congestion control scheme is modified such that the receiver rate measuring period is artificially extended to make the rate response value much lower that it would otherwise be if no delay accumulation had occurred. The effect of extending the measuring period is to reduce the calculated receiving rate $R_r$ and thereby force the sending endnode 21 to reduce the sending rate $R_s$. The result of such a reduction in the sending rate $R_s$ is the reduction of the accumulated delays along the connection path, reducing the effect of the accumulation effect.

In general, the accumulation effect is detected by detecting changes in the network shift/delay time $T_s$ for each rate request message from the sending endnode 21 (FIG. 2). The value of $T_s$, in turn, can be approximated by determining the difference between the sending measuring period and the receiving measuring period. That is, the difference between the receiving endnode measurement period $M_r$ and the corresponding sending endnode measurement period $M_s$ is measured to approximate changes over time of the network delay. As noted in connection with FIG. 6, the value of $M_r$ can be sent to the receiving endnode 23 piggy-backed on a data segment along with the request for the receiving rate $R_r$. $T_s$ can be thought of as the network queuing time of rate request messages. Due to local congestion at intermediate nodes, the queuing time at these nodes can increase or decrease over time, thus allowing the value of $T_s$ to vary over time. The successive values of $T_s$ for successive rate request messages are accumulated (in a variable called TS) and compared to a ceiling (called $T_q$) calculated at the time the connection is set up. If TS falls below zero, no accumulation has occurred and the accumulation process is restarted to detect future increases in the network queuing time. On the other hand, if $T_s$ exceeds $T_q$, the receiving endnode measuring period $M_r$ is increased (for example, by $T_q$) to reduce the rate $R_r$ fed back to the receiving endnode and thereby force the reduction of the sending rate $R_r$. This reduction in the sending rate reduces the probability of further congestion due to the longer network queuing time and thereby avoids the congestion due to the accumulation effect. This accumulation effect avoidance algorithm is implemented in FIG. 9.

Figure 9:
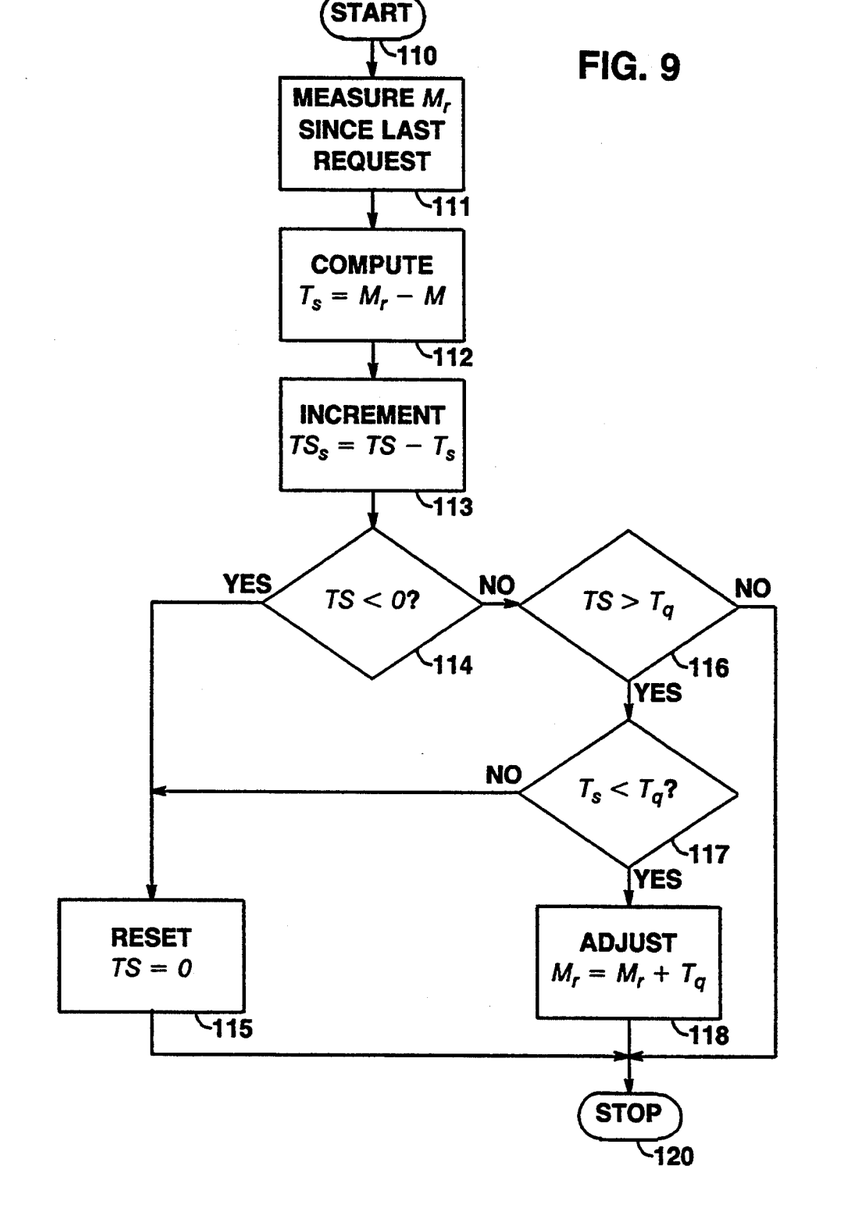
FIG. 9 show a flow chart of the operation of the receiving endnode in calculating the measurement period used for determining the rate information which is returned to the corresponding sending endnode in the packet network of FIG. 1, implementing the dynamic control scheme of the present invention.

In FIG. 9 there is shown a flow chart of the process for computing and transmitting a new receive rate $R_r$, as called for in box 105 of FIG. 8. Starting in start box 110, box 111 is entered where the length of the measurement period $M_r$ since the last request is measured. This measurement involves no more than subtracting the arrival time of the previous rate request message from the arrival time of the current rate request message. Box 112 is then entered where the value of the network queuing shift $T_s$ is calculated as the difference between the current receiving endnode measuring cycle $M_r$ and the previous sending endnode measuring cycle $M_s$. Box 113 is then entered to accumulate the new value of $T_s$ with the previously accumulated values in TS. Decision box 114 is then entered to determine if the value of TS is less than zero. If so, no accumulation avoidance is necessary and box 115 is entered to reset the value of TS to zero. The process then terminates in stop box 120.

If the value of TS is not less than zero, as determined in decision box 114, decision box 116 is entered to determine if the value of TS exceeds the precalculated delay ceiling $T_q$. If not, the process is terminated in stop box 120. If, however, the value of TS is equal to or exceeds the value of $T_q$, as determined by decision box 116, decision box 117 is entered to determine if the latest measured value of $T_s$ is less than $T_q$. If so, box 118 is entered to adjust the receiving measuring period. As suggested in box 118, the measuring period $M_r$ can be adjusted by adding to it the value of the delay ceiling $T_q$. This value of the increment to $M_r$ insures that the resulting receiving rate $R_r$ will be reduced sufficiently to trigger a reduction in the sending rate $R_s$. Other values for this increment can also be used if the result is a reduction in the sending rate $R_r$. The process then ends in stop box 120. As show in FIG. 8, however, this new value for $M_r$ is used in calculating $R_r$.

If the value of $T_s$ is equal to or greater than $T_q$, as determined by decision box 117, it must be assumed that an error has occurred, such as the loss of a rate request message, and box 115 is re-entered to reset TS to zero to start a new drift measurement cycle. The process then terminates in stop box 120 without adjusting the value of $M_r$.

It should also be clear to those skilled in the art that further embodiments of the present invention may be made by those skilled in the art without departing from the teachings of the present invention.

---

APPENDIX
Pseudo-Code Algorithms for Adaptive Rate-Based Flow and Congestion Control

Data Sending Algorithm at Sending Endnode

```
IF (More Data Can Be Sent in Interval B_t) THEN
  IF (M_s Has Elapsed) THEN
    Build Data Segment
    Piggy-Back Receiver Feedback Request
    Compute R_a Sent During M_s = Bits Sent Divided by M_s
  END
  Send Data Segment
END
```

Feedback Processing Algorithm at Sending Endnode

```
IF (R_r < R_a - Δ_R) THEN
  Set Rate R_s = θ × R_r
  Set MODE to "YELLOW"
  Set R_inc = max( R_inc/2 , R_inc^min )
ELSE
```

---

APPENDIX
Pseudo-Code Algorithms for Adaptive Rate-Based Flow and Congestion Control

```
IF (R_r ≥ R_a) and (MODE = GREEN) THEN
  R_s = max(R_s, R_a + R_inc)
  But R_s ≤ min(R_s, R_max)/* Rate Cannot Exceed
    Maximum Rate Allowed */
END
Set MODE to "GREEN"
END
Compute New B_t
Compute New M_s, if Required.
```

Time-Out Algorithm at Sending Endnode

```
IF (Time_Out and No_Rate_Request) THEN
  Set Mode to "RED"
  Cut R_s by half, R_s = min(0.5 × R_s, R_r)
  Set R_inc = R_inc^min
  Compute new B_t
  Compute new M_r, if necessary
END
```

Rate Calculation Algorithm at Receiving Endnode

```
Receive Packet
Process Packet
  N_r = N_r + Packet Size
IF (Rate Request) THEN
  IF (No Packet Loss Detected) THEN
    Compute M_r
    /* See Interval Computation Algorithm Below */
    Compute R_r = N_r/M_r
    Return Acknowledgement Message Including R_r
  ELSE
    Return Message Indicating Packet Loss
  END
END
```

Interval Computation Algorithm at Receiving Endnode (Accumulation Effect Avoidance)

```
Measure Elapsed Time M_r Since Last Rate Request
Compute T_s = M_r - M_s
Accumulate TS = TS + T_s
IF (TS < 0) THEN
  Reset TS = 0   /* Start a New Timing Cycle */
ELSE
  IF (TS > T_q) THEN
    IF (T_s < T_q) THEN
      Send Message Forcing Sender to Reduce Rate
      Adjust M_r = M_r + T_q
    END
    Reset TS = 0   /* Start a New Timing Cycle */
  END
END
```

---

What is claimed is:

1. A closed loop rate-based flow and congestion control system for a packet communications network providing a connection for the transmission of packets between a sending endnode and a receiving endnode of said network, said control system comprising
    means at said receiving endnode for determining the lower of either the rate at which said packets are delivered from said network to said receiving endnode or the rate at which said packets are delivered from said receiving endnode to a connected user,
    means for transmitting said lower rate from said receiving endnode to said sending endnode of said network, and
    means for adjusting the rate at which packets are launched from said sending endnode on said connection in response to said lower rate.

2. The flow and congestion control system according to claim 1 wherein
    said rates are determined over a measurement period approximately equal to the round trip delay of packets transmitted through said network between said sending endnode and said receiving endnode.

3. The flow and congestion control system according to claim 2 further comprising
means for determining changes in the transmission delay in said connection, and
means responsive to accumulations in said transmission delay for extending said measurement period.

4. The flow and congestion control system according to claim 1 further comprising
means for piggy-backing said lower rate on one of said packets being transmitted from said receiving endnode to said sending endnode.

5. The flow and congestion control system according to claim 1 further comprising
means at said sending endnode for generating a request for rate information,
means for transmitting said request to said receiving endnode, and
means at said receiving endnode for enabling said means for determining said lower rate in response to said request.

6. The flow and congestion control system according to claim 5 wherein said means for transmitting said request comprises
means for piggy-backing said request on one of said packets being transmitted from said sending endnode to said receiving endnode.

7. The flow and congestion control system according to claim 1 wherein said means for adjusting the packet launching rate comprises
means for increasing said packet launching rate in response to said lower rate exceeding the current packet launching rate.

8. The flow and congestion control system according to claim 7 wherein said means for increasing said packet launching rate includes
means for increasing said packet launching rate in equal increments.

9. The flow and congestion control system according to claim 7 wherein said means for increasing said packet launching rate includes
means for increasing said packet launching rate in non-equal increments.

10. The flow and congestion control system according to claim 1 wherein said means for adjusting the packet launching rate comprises
means for decreasing said packet launching rate in response to the current packet launching rate exceeding said lower rate.

11. The flow and congestion control system according to claim 10 wherein said means for decreasing said packet launching rate includes
means for decreasing said packet launching rate in non-equal increments.

12. A closed loop rate-based method for controlling data packet flow and congestion in a packet communications network providing a connection for the transmission of packets between a sending endnode and a receiving endnode of said network, said method comprising the steps of
determining at said receiving endnode the lower of either the rate at which said packets are delivered from said network to said receiving endnode or the rate at which said packets are delivered from said receiving endnode to a connected user,
transmitting said lower rate from said receiving endnode to said sending endnode of said network, and
adjusting the rate at which packets are launched from said sending endnode on said connection in response to said lower rate.

13. The flow and congestion control method according to claim 12 wherein said rate determining step further comprises the step of
determining said rates over a measurement period approximately equal to the round trip delay of packets transmitted through said network between said sending endnode and said receiving endnode.

14. The flow and congestion control method according to claim 13 further comprising the steps of
determining changes in the transmission delay in said connection, and
extending said measurement period in response to accumulations in said transmission delay.

15. The flow and congestion control system according to claim 12 further comprising the step of
piggy-backing said lower rate on one of said packets being transmitted from said receiving endnode to said sending endnode.

16. The flow and congestion control method according to claim 12 further comprising the steps of
generating at said sending endnode a request for rate information,
transmitting said request to said receiving endnode, and
enabling said step of determining said lower rate in response to said request.

17. The flow and congestion control method according to claim 16 wherein said step of transmitting said request comprises the step of
piggy-backing said request on one of said packets being transmitted from said sending endnode to said receiving endnode.

18. The flow and congestion control method according to claim 12 wherein said step of adjusting the packet launching rate comprises the step of
increasing said packet launching rate in response to said lower rate exceeding the current packet launching rate.

19. The flow and congestion control method according to claim 18 wherein said step of increasing said packet launching rate further includes the step of
increasing said packet launching rate in equal increments.

20. The flow and congestion control method according to claim 18 wherein said step of increasing said packet launching rate further include the step of
increasing said packet launching rate in non-equal increments.

21. The flow and congestion control method according to claim 12 wherein said step of adjusting the packet launching rate further comprises the step of
decreasing said packet launching rate in response to the current packet launching rate exceeding said lower rate.

22. The flow and congestion control system according to claim 21 wherein said means for decreasing said packet launching rate includes
means for decreasing said packet launching rate in non-equal increments.

* * * * *